US008229923B2

(12) United States Patent  
Mirchandani et al.

(10) Patent No.: US 8,229,923 B2
(45) Date of Patent: Jul. 24, 2012

(54) MULTIDIMENSIONAL DATA SPACE QUERIES WITH EXPRESSION EVALUATION

(75) Inventors: Akshai M. Mirchandani, Redmond, WA (US); Marius Dumitru, Issaquah, WA (US); Mosha Pasumansky, Redmond, WA (US); Irina G. Gorbach, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 12/239,695

(22) Filed: Sep. 26, 2008

(65) Prior Publication Data

US 2010/0082577 A1    Apr. 1, 2010

(51) Int. Cl.
*G06F 7/00* (2006.01)
*G06F 17/30* (2006.01)
(52) U.S. Cl. ......... 707/718; 707/737; 707/769; 707/957
(58) Field of Classification Search ................. 707/713, 707/999.001–999.005, 718, 737, 769
See application file for complete search history.

(56) References Cited

U.S. PATENT DOCUMENTS

| | | | |
|---|---|---|---|
| 6,381,596 B1 * | 4/2002 | Bayer | 707/999.001 |
| 2003/0088540 A1 * | 5/2003 | Edmunds et al. | 707/1 |
| 2004/0215626 A1 | 10/2004 | Colossi et al. | |
| 2005/0283459 A1 * | 12/2005 | MacLennan et al. | 707/1 |
| 2006/0010113 A1 * | 1/2006 | Berger et al. | 707/3 |
| 2006/0200448 A1 * | 9/2006 | Edmunds et al. | 707/2 |
| 2007/0106643 A1 * | 5/2007 | Croft et al. | 707/3 |
| 2007/0118501 A1 * | 5/2007 | Yan | 707/2 |
| 2007/0192306 A1 * | 8/2007 | Papakonstantinou et al. | 707/5 |
| 2007/0219957 A1 | 9/2007 | D'Hers et al. | |
| 2007/0255681 A1 | 11/2007 | Tien et al. | |
| 2008/0120292 A1 * | 5/2008 | Sundaresan et al. | 707/5 |
| 2008/0201293 A1 * | 8/2008 | Grosset et al. | 707/2 |

OTHER PUBLICATIONS

Jianlin Feng , Hongjie Si , Yucai Feng, Indexing and incremental updating condensed data cube, Proceedings of the 15th international conference on Scientific and statistical database management, p. 23-32, Jul. 9-11, 2003.*

(Continued)

*Primary Examiner* — Mohammad Ali
*Assistant Examiner* — Kannan Shanmugasundaram
(74) *Attorney, Agent, or Firm* — Mayer & Williams P.C.

(57) ABSTRACT

A system and techniques for executing queries of a sparse multidimensional data space in the presence of expressions. A dimension is associated with a set of data references, which reference stored data items. A query expression has dimension or a data reference as an operand. A result space with one or more result dimensions is defined based on the query. A plan is built and executed for retrieving the stored data items associated with the result dimensions, and forming "calculated data items" by evaluating the expression. Executing the plan produces a stream of data tuples, each having a set of data components storing the retrieved data items and/or the calculated data items. Data components are either empty or have data values. An iterative algorithm is employed on the stream to locate the data tuples that are empty at the intersection of each result dimension.

20 Claims, 5 Drawing Sheets

OTHER PUBLICATIONS

S.-L. Lee. "An Effective Algorithm to Extract Dense Sub-cubes from a Large Sparse Cube.". In: A. M. Tjoa and J. Trujillo, Eds., DaWaK, pp. 155-164, Springer, 2006.*

Pearson, III, William E. "Optimizing Microsoft SQL Server Analysis Services: MDX Optimization Techniques Optimizing NON EMPTY", retrieved at <<http://sql-server-performance.com/articles/biz/optimizing_non_empty_p1.aspx>>, Apr. 20, 2004, pp. 3.

"Analysis Services Best Practise Analyser", retrieved at <<http://www.u2u.be/res/SQL05_ASBPA.aspx>>, Jul. 15, 2008, pp. 3.

Beckmann, et al.,"Extending RDBMSs to Support Sparse Datasets Using an Interpreted Attribute Storage Format" retrieved at <<http://pages.cs.wisc.edu/~naughton/includes/papers/sparsedatasets.pdf>>, Apr. 2006, pp. 10.

"Oracle OLAP" "The most powerful, open Analytic Engine" retrieved at <<http://oracleolap.blogspot.com/2008/01/olap-workshop-6-advanced-cube-design.html>>Jan. 24, 2008, pp. 16.

* cited by examiner

MULTIDIMENSIONAL DATA SPACE QUERIES WITH EXPRESSION EVALUATION

BACKGROUND

A multidimensional data space combines stored data from a number of data sources. An example of a multidimensional data space is a relational database. A dimension of a data space is a collection of references to stored data. In the context of relational databases, such references to stored data are often called attributes, or cells. It is generally recognized that many multidimensional data spaces contain no stored data at the intersection of two or more dimensions of the data space—such data spaces are referred to as sparse.

Various languages and syntaxes have been developed to query multidimensional data spaces. Some query languages support the use of expressions which, when evaluated, transform and/or perform calculations based on stored data. Query performance and the presentation of query results are often negatively impacted by sparse data spaces, especially when expressions are present.

SUMMARY

Systems and techniques for executing queries of sparse multidimensional data spaces in the presence of expressions are discussed herein. An exemplary data space has a number of dimensions, each dimension associated with a set of data references. A set of data references is defined to reference one or more stored data items located in one or more co- or separately-located computer-readable storage media. An exemplary query of the data space includes an expression with at least one operand referring to a particular dimension or a particular data reference or both.

After the query is received, a query result space (for example, a data cube or other data schema) is defined, which has one or more result dimensions. A plan is built for: (1) retrieving the stored data items referenced by the sets of data references associated with the result dimensions, and (2) evaluating the expression based on the retrieved stored data items to generate "calculated data items." The plan is executed to produce a stream of data tuples. Each data tuple has a set of data components that store retrieved stored data and/or calculated data items. Each data component is either empty or has a data value.

An iterative process is employed on the data tuple stream to locate the data tuples that are empty at the intersection of the data tuple and each result dimension. A query result that includes the non-empty data tuples may be ordered and/or presented to a user in any desired format.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Systems and techniques are discussed herein for executing queries of sparse multidimensional data sets, when the queries involve the evaluation of expressions based on data items stored in the data sets.

Figure 1:
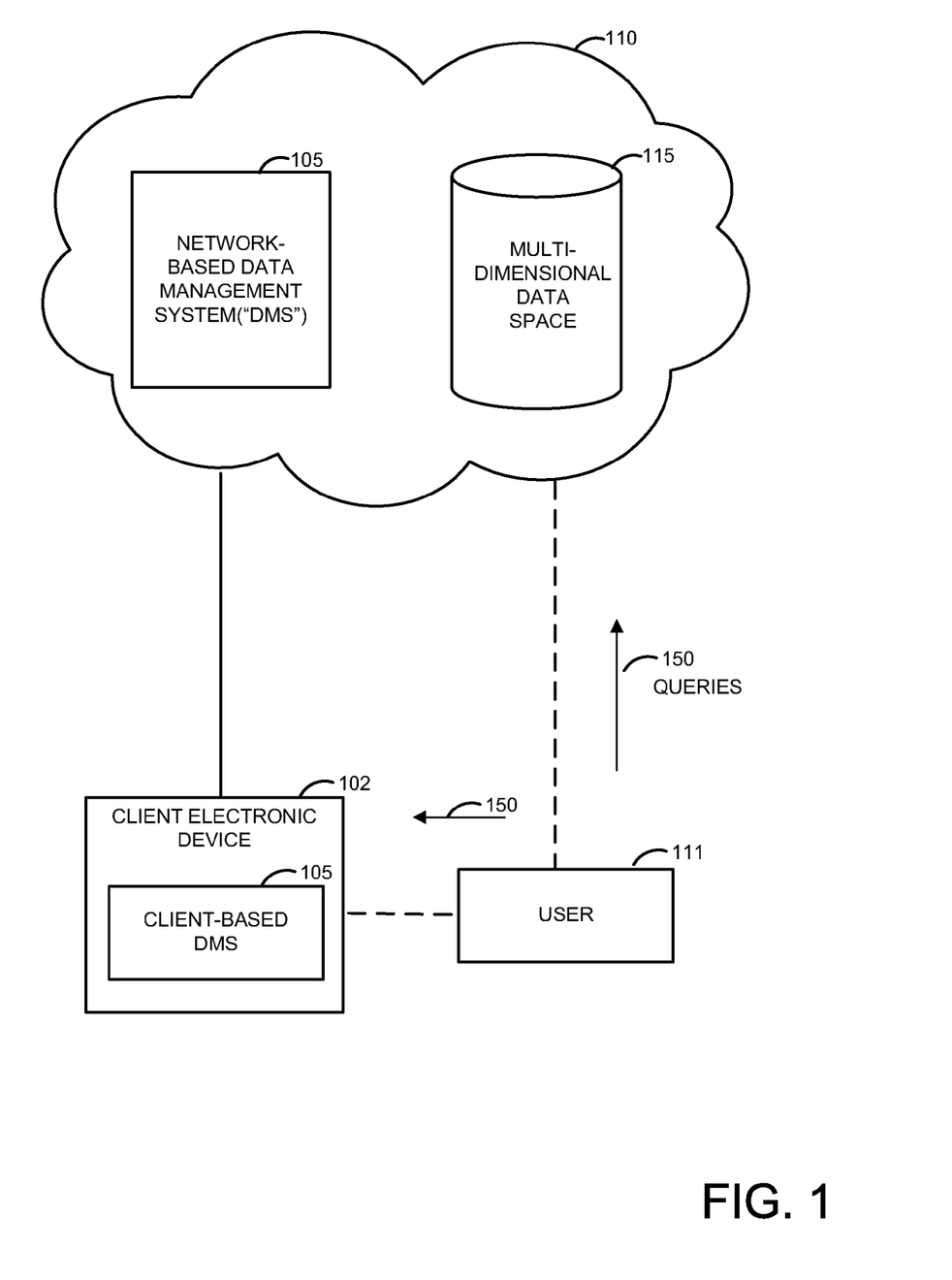
FIG. 1 is a simplified functional block diagram of a communication architecture with which aspects of the systems and techniques discussed herein may be implemented or used.

Turning now to the drawings, where like numerals designate like components, FIG. 1 is a simplified functional block diagram of an exemplary communication architecture 100, within which aspects of a network- or client-based data management system ("DMS") 105 (shown and described in more detail in connection with FIG. 3) may be implemented or used. DMS 105 represents any system or component thereof for querying a multidimensional data space 115. As shown, a user 111 poses queries 150 (discussed further below, in connection with FIG. 2) to DMS 105. One example of a multidimensional data space 115 is a relational database, although any multidimensional collection of data—regardless of format—is possible.

As shown, aspects of DMS 105 are implemented within one or more servers/services within network(s) 110, and/or within client electronic device 102. Network-based DMS 105 represents any network-side implementations of systems or techniques described herein. For example, certain network-based servers may host a variety of functions associated with DMS 105 (implemented using any desired infrastructure or technique). Networks 110 represent any existing or future, public or private, wired or wireless, wide-area or local-area, packet-switched or circuit-switched, one-way or two-way data storage, processing, or transmission infrastructures, technologies, techniques, or signals. Client electronic device 102 represents any known or later developed portable or non-portable consumer or commercial device, including but not limited to: a personal computer, a telecommunication device, a personal digital assistant, a media player, a home entertainment device, an in-vehicle device, a camera or video recorder, or a server.

Figure 2:
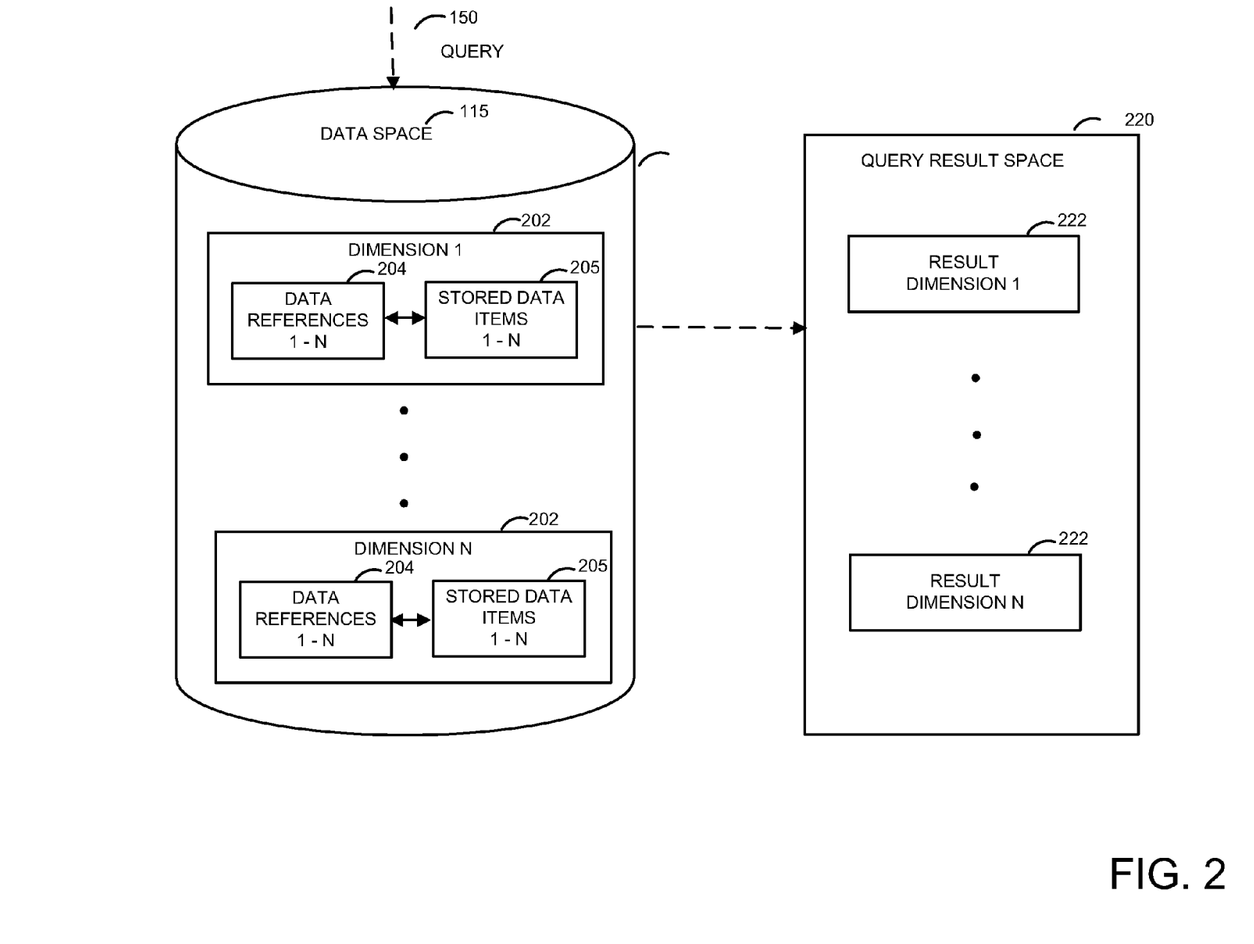
FIG. 2 is a simplified functional block diagram of the multidimensional data space shown in FIG. 1, further illustrating a query result space based on a query of the multidimensional data space.

FIG. 2 is a simplified functional block diagram of multidimensional data space 115, further illustrating a query result space 220, which is identified based on application of aspects of a particular query 150 to the multidimensional data space.

Multidimensional data space 115 has a number of dimensions 202 (dimensions 1 through n are depicted). Associated with each dimension is a set of data references 204 (data references 1-n are depicted). A particular data reference is defined to reference one or more stored data items 205. Generally, stored data items 205 are located in one or more co- or separately-located computer-readable storage media (computer-readable storage media are shown and discussed below, in connection with FIG. 5). For example, consider the simplified scenario of a multidimensional data space that stores sales data for a large number of products over time: the products may be considered to be dimensions of the data space, while a set of data references might include but not be limited to "product name," "product category," "product line," and "sales count."

Query 150 represents any mechanism for retrieving information from multidimensional data space 115. Generally, database queries include questions presented using a predefined language and/or format, such as the Structured Query Language ("SQL") query format or the multidimensional expressions ("MDX") language query format, although any known or later developed query language format or syntax thereof is possible. Query 150 has an expression (not shown) with at least one operand referring to a particular dimension or a particular data reference or both. It will be appreciated that various types of operators may be included in queries—for example, logical operators, mathematical operators, or other types of operators. For example, in the scenario of the multidimensional data space that stores sales data, an exemplary query (presented using correct applicable query language and syntax, which is beyond the scope of this discussion) with an expression could be a request for an "average sales count" for a certain product. The expression would be evaluated by calculating an average of numeric type data items stored within the "sales count" data reference within a particular "product" dimension.

Based on the particular data space 115 and query 150, a query result space 220, which has one or more result dimensions 222, can be defined. An exemplary query result space is a data cube, such as an online analytical processing cube, although any desired data schema (for example, horizontal, vertical, interpreted, or positional) may be used, based on the definition(s) of the particular multidimensional data space being queried and/or on the query parameters. It may also be desirable to prepare other temporary or persistent data structures (not shown or discussed further herein) for use in applying a particular query a particular multidimensional data space.

Figure 3:
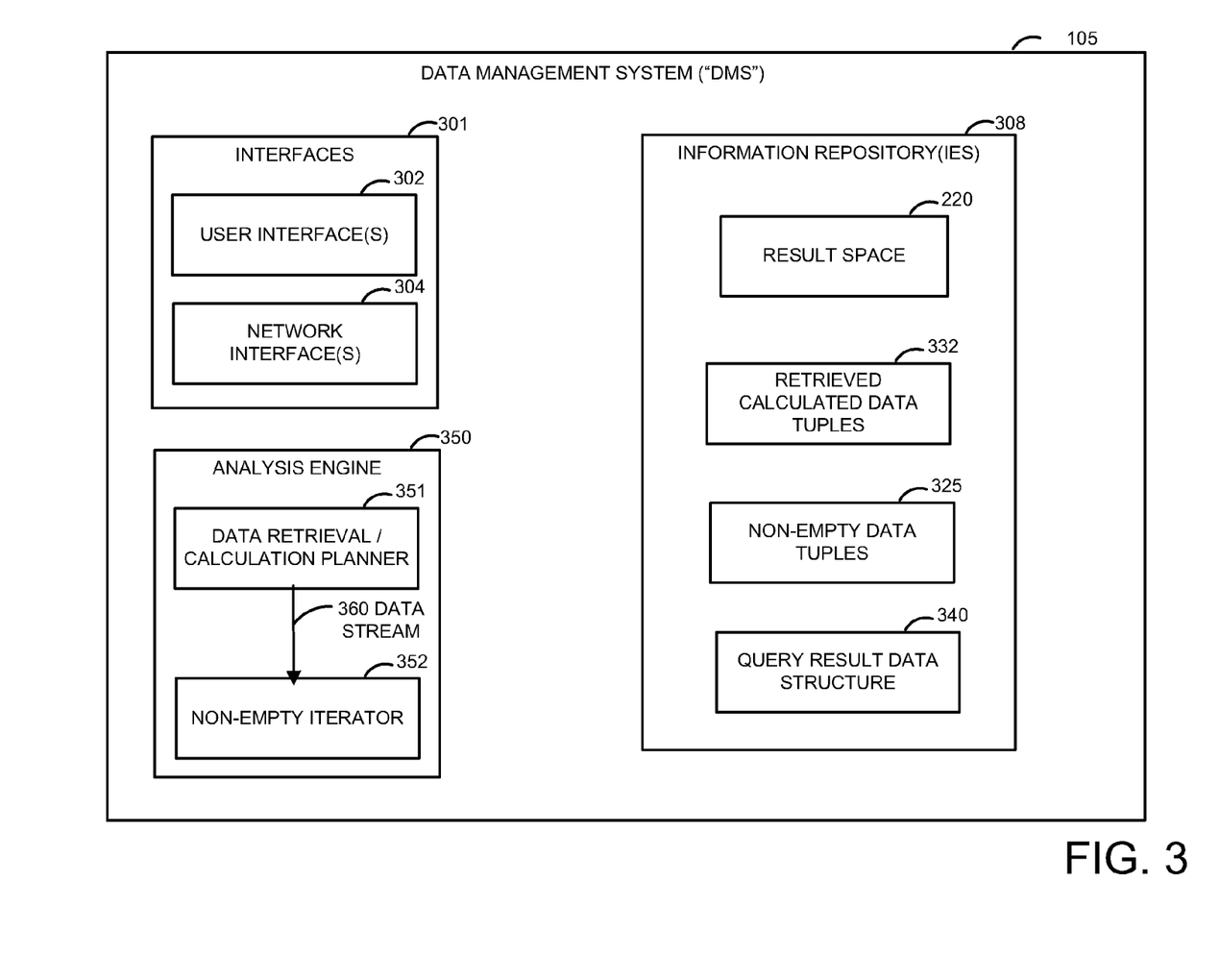
FIG. 3 is a simplified functional block diagram of the data management system shown in FIG. 1.

With continuing reference to FIGS. 1 and 2, FIG. 3 is a simplified functional block diagram of DMS 105, which supports the querying of multidimensional data space 115. Because the architecture of DMS 105 is flexible, various functions can be performed using network-side processing, client-side processing, or a combination thereof. In general, design choices and/or operating environments dictate how and whether specific functions of DMS 105 are implemented. Such functions may be implemented using hardware, software, firmware, or combinations thereof. Particular configurations of DMS 105 may include fewer, more, or different components than those described. It will further be understood that computer programs that implement communication-related functions of DMS 105 may operate at any layer of a communication protocol stack.

As shown, DMS 105 includes: interfaces 301 (including but not limited to user interface(s) 302 and network interface(s) 304); analysis engine 350 (including data retrieval/calculation planner 351, which transmits data stream 360 to non-empty iterator 352); and information repository(ies) 308, which store, among other things, result space 220, retrieved/calculated data tuples 332, non-empty data tuples 335, and a query result data structure 340.

User interface(s) 302 represent a combination of presentation tools and controls that define the way user 111 interacts with DMS 105. One type of user interface is a graphical user interface, although any known or later developed type of user interface is possible.

Network interface(s) 304 are one or more physical or logical elements that enhance the ability of DMS 105 to receive information from, or transmit information to, an external computing environment.

Analysis engine 350 represents one or more sets of computer-executable instructions for processing multidimensional data space 115 to respond to queries 150 that have expressions as discussed herein (computer-executable instructions 506 are shown and discussed further below in connection with FIG. 5). In one possible implementation, analysis engine 350 may be implemented using, or in conjunction with, online analytical processing techniques. As discussed in more detail below in connection with FIG. 4, data retrieval/calculation planner 351 is responsible for building a plan for retrieving stored data items 205 referenced by the sets of data references 204 associated with result dimensions 222 in a particular query result space 220, and for producing "calculated data items" via evaluation of query expressions based on the stored data items that were retrieved. The plan is executed to produce a data stream 360, in particular, a stream of retrieved/calculated data tuples 332. Each data tuple 332 has a set of data components that store the retrieved stored data and/or the calculated data items. Each data component is either empty or has a data value.

Non-empty iterator 352 (also discussed in more detail below in connection with FIG. 4) employs an iterative algorithm to locate the data tuples 332 in the data stream that are empty at the intersection of the data tuple and each result dimension 222. Such data tuples are referred to as "non-empty data tuples" 325. A query result data structure 340 may facilitate storage and/or arrangement of the non-empty data tuples. The non-empty data tuples 325 may be presented to user 111, via user interface(s) 302, in any desired format.

Information repository(ies) 208 represent general data storage capability for information relating to DMS 105. Information repositories 208 may be implemented using various types and arrangements of computer-readable media 504 (discussed further below, in connection with FIG. 5). Result space 220, data tuples 332 (and any data structures associated therewith), and data tuples 335 (along with any data structures associated therewith such query result data structure 340) represent frameworks that facilitate organization and interpretation of data from multidimensional data space 115, and as such may generally be configured in any manner that supports the functionality of DMS 105 described herein.

With continuing reference to FIGS. 1-3, FIG. 4 is a flowchart of an exemplary method for executing a query, such as query 150, of a multidimensional data space, such as multidimensional data space 115. The method illustrated in FIG. 4 may be implemented by computer-executable instructions, such as computer-executable instructions associated with analysis engine 350, which are stored in a computer-readable medium and executed by one or more general, multi-purpose, or single-purpose processors (computer-executable instructions 506, computer-readable media 504 and processor 502 are shown and discussed below, in connection with FIG. 5). Unless specifically stated, the method is not constrained to a particular order or sequence. In addition, some of the method or steps thereof can occur or be performed concurrently and/or repeatedly.

Figure 4:
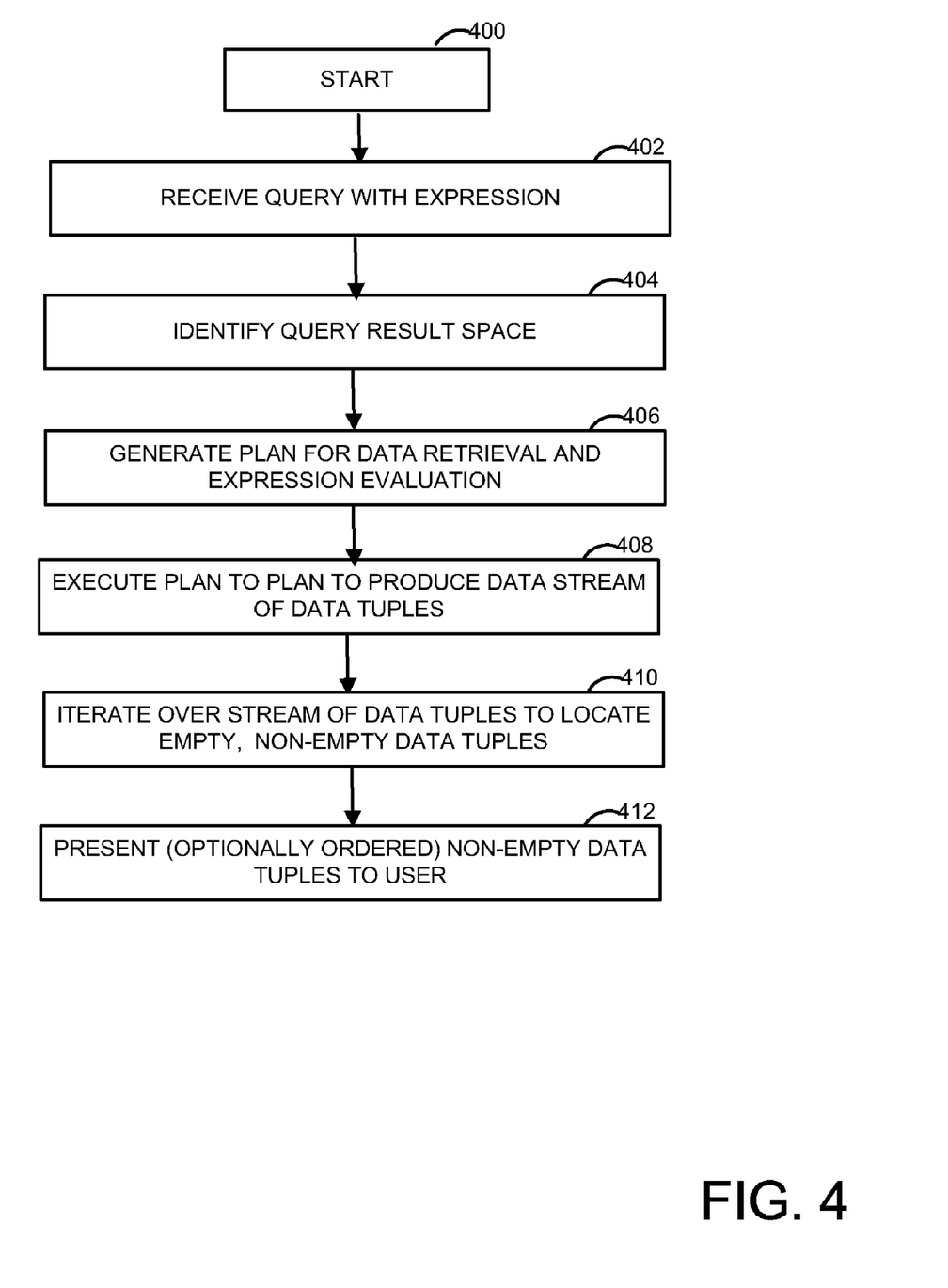
FIG. 4 is a flowchart of a method for executing a query of the multidimensional data space shown in FIGS. 1 and 2.

The method begins at block 400 and continues at block 402, where a query with an expression is received. As discussed above, query 150 has an expression with at least one operand referring to a particular dimension or a particular data reference (or both) of data space 115.

At block 404, a query result space, such as query result space 220, is identified/defined. Generally, query result space 220 includes a number of result dimensions 222. Result dimensions 222 may be in part a sub-set of dimensions 202 based on the parameters of query 150, and may also include one or more dimensions desirable for managing "calculated data items" to be generated via evaluation of the query expression(s). It will be appreciated that a particular result dimension 222 may appear in query result space 220 multiple times. Although not discussed in detail herein, it may be necessary or desirable to restrict data space 115 via application of various filters and/or lists, and/or to prepare a number of temporary or persistent internal data structures to be used in performing the method described herein.

Next, at block 406, a plan is generated for: (1) retrieving stored data items from the multidimensional data space, such as stored data items 205, which are associated with result dimensions, such as result dimensions 222, in the query result space; and (2) evaluating the query expression based on the retrieved data items, to produce what are referred to as "calculated data items." The plan is executed, as indicated at block 408, to produce a stream of data tuples, such as data stream 360 that includes retrieved/calculated data tuples 332.

In the context of DMS 105, data retrieval/calculation planner 351 is responsible for building and executing the plan for retrieving stored data items from data space 115, and evaluating the query expression based thereon. Building the plan for retrieving stored data items and evaluating the query expression based thereon may involve use a predetermined algorithm or syntax to parse the query expression into a symbolic expression, such as an object tree. Upon execution of the plan, the symbolic expression is processed and stream of data tuples 360 is produced. In one possible implementation, the data stream is produced by an analysis engine that is separate from a data storage engine. Data retrieval/calculation planner 351 may arrange for the symbolic expressions to be evaluated in "bulk mode," which could realize significant performance gains. It is also possible for a sparse calculation space to be translated into a more dense calculation space prior to or in conjunction with building the plan, to increase execution efficiency. In the context of relational databases, it is possible to identify situations when user-provided calculation expressions that would normally require "CROSS JOIN"-based evaluation, and to automatically translate and/or rewrite such expressions into equivalent expressions operating over a smaller "INNER JOIN" space.

At block 410, a process of iterating over the data tuples in the data stream produced at block 408 is performed. In the context of DMS 105, non-empty iterator 352 implements the iteration process for retrieved/calculated data tuples 332 received from data retrieval/calculation planner 351 via data stream 360. Generally, a subject data tuple is identified from the data stream, and it is determined whether each data component of the subject data tuple is empty at an intersection of the subject data tuple and each result dimension 222. When each data component of the subject data tuple is empty at the intersection, then the subject data tuple is not added to the query result set/data structure. When any data component of the subject data tuple has a data value at an intersection of the subject data tuple and any result dimension, then the subject data tuple is added to the query result set/data structure. In one possible implementation, the iteration process involves use of the MDX language "NON EMPTY" operator. The NON EMPTY operator takes two sets and removes the tuples from the first set that produce null values on intersection with the second set. If only non-empty data items are stored in a storage data cache from which stored data items are retrieved and/or used for expression evaluation, then the NON EMPTY operator may have greater efficiency than if the data cache is sparse.

The non-empty data tuples (if any) located via the iterative process of block 410 may be ordered, if desired (for example, to match the order of the original data or in accordance with another desired ordering scheme) and presented to a user, as indicated at block 412. In the context of DMS 105, for example, such presentation may be accomplished in a single- or multi-dimensional format via graphical user interface 302.

In this manner, queries of multidimensional data spaces in the presence of expressions can be efficiently executed. An execution plan is built and executed to produce a stream of data tuples that includes retrieved and calculated data items and that can be iterated over to locate non-empty data tuples. This approach mitigates the inefficiencies associated with first retrieving stored data, then separately iterating over that cache of data to evaluate expressions, and again separately iterating over the resulting data tuples on the result dimensions to determine if they are non-empty and can therefore be added to a query result.

With continuing reference to FIGS. 1-4, FIG. 5 is a simplified functional block diagram of an operating environment 500 with which the systems and techniques discussed herein may be implemented or used. Operating environment 500 is indicative of a wide variety of general-purpose, special-purpose, client- or server-based, stand-alone or networked computing environments.

Figure 5:
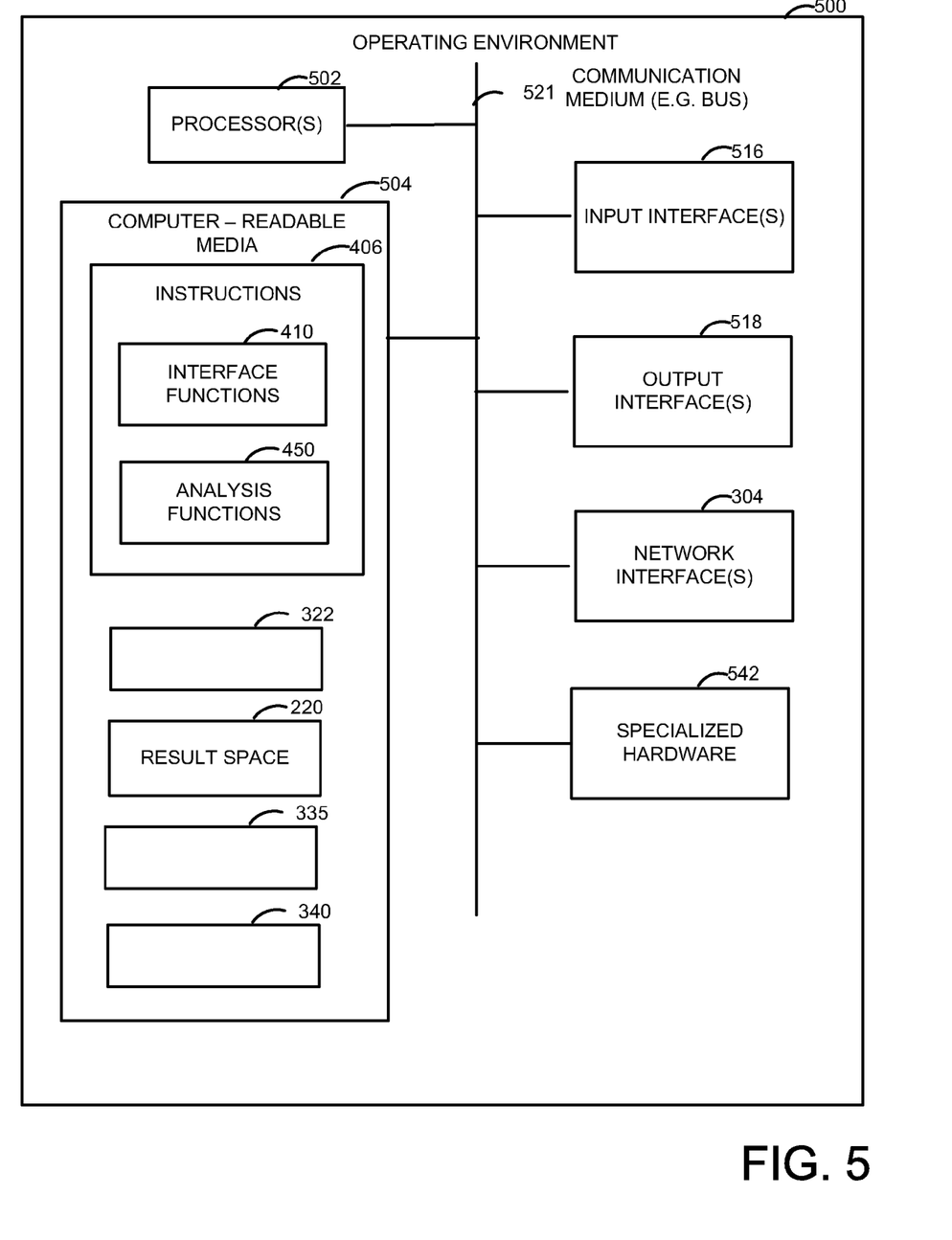
FIG. 5 is a simplified functional block diagram of an exemplary operating environment with which aspects of the data management system shown in FIG. 3 and/or the method shown in FIG. 4 may be implemented or used.

One or more components shown in FIG. 5 may be packaged together or separately to implement functions of operating environment 500 (in whole or in part) in a variety of ways. As shown, a communication medium 521, such as a bus, carries data, addresses, control signals and other information within, to, or from computing environment 500 or components thereof.

A processor 502, which may be one or more real or virtual processors, controls functions of operating environment 500 by executing computer-executable instructions 506 (discussed further below).

Computer-readable media 504 represent any number and combination of local or remote components, in any form, now known or later developed, capable of recording, or storing, computer-readable data, such as instructions 506 (discussed further below) executable by processor 502 and data, such as stored data items 205, result space 220, query result data structure 340, retrieved/calculated data tuples 332, and/or non-empty data tuples 335. In particular, computer-readable media 504 may be, or may include: a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof.

Computer-executable instructions 506 represent any signal processing methods or stored instructions that electronically control predetermined operations on data. In general, computer-executable instructions 506 are implemented as software programs according to well-known practices for component-based software development, and encoded in computer-readable media (such as one or more types of computer-readable media 504). Software programs may be combined or distributed in various ways. Examples of computer-executable instructions 506 include but are not limited to:

interface functions 410, which implement the functionality of user interface(s) 302 and network interface(s) 304; and analysis functions 450, which implement the functionality (including but not limited to data retrieval/calculation planner 351 and non-empty iterator 352) of analysis engine 350.

Network interface(s) are one or more physical or logical elements that enhance the ability of operating environment 500 to receive information from, or transmit information to, another operating environment.

Specialized hardware/firmware 542 represents any hardware or firmware that implements functions of operating environment 500. Examples of specialized hardware/firmware 142 include encoder/decoders ("CODECs"), decrypters, application-specific integrated circuits, secure clocks, and the like.

Input interface(s) 516 facilitate the receipt of input to operating environment 500. Input may be collected using any type of now known or later developed physical or logical interface, such as a user interface (including but not limited to remote controls, displays, mice, pens, styluses, trackballs, keyboards, microphones, scanning devices, windows, menus, and the like). Output interface(s) 518 provide output from operating environment 500. Output may be provided using any now known or later developed physical or logical interface. Examples of output interfaces include but are not limited to displays, printers, speakers, portable and non-portable computer-readable media, and the like.

A system and techniques for executing queries of a multi-dimensional data space have been described herein. It will be understood that all of the described components/elements need not be used, nor must the components/elements, when used, be present concurrently. Elements/components described as being computer programs are not limited to implementation by any specific embodiments of computer programs, and rather are processes that convey or transform data, and may generally be implemented by, or executed in, hardware, software, firmware, or any combination thereof.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-implemented method of executing a query of a data space having a number of dimensions, a particular dimension associated with a set of data references, a particular data reference defined to reference one or more stored data items located in one or more computer-readable storage media, the method comprising:
   receiving a query of the data space, the query having an expression with an operand comprising a particular dimension or a particular data reference or both, evaluation of the expression producing one or more calculated data items;
   based on the data space and the query, identifying a query result space, the query result space having one or more result dimensions;
   generating a calculation execution plan for each of one or more subcubes covering the query result space and for retrieving, from the one or more computer-readable storage media, stored data items referenced by the sets of data references associated with the result dimensions, and for evaluating the expression based on the retrieved stored data items to produce calculated data items, the calculation execution plan including a subcube to which the calculation execution plan applies and a calculation to be applied to the subcube;
   executing the calculation execution plan to produce a stream of data tuples, a particular data tuple having a set of data components storing the retrieved stored data items or storing the produced calculated data items, a particular data component of a particular data tuple being either empty or having a data value;
   iterating over the data tuples in the stream of data tuples, the iterating not including symbolic analysis of calculation expressions within data in the stream, the step of iterating comprising
      identifying a subject data tuple within the stream,
      determining whether each data component of the subject data tuple is empty at an intersection of the subject data tuple and each result dimension,
      when each data component of the subject data tuple is empty at an intersection of the subject data tuple and each result dimension, do not populate a query result set stored in a query result data structure with the subject data tuple, and
      when any data component of the subject data tuple has a data value at an intersection of the subject data tuple and any result dimension, do populate the query result set with the subject data tuple; and
   after iterating, presenting contents of the query result data structure to a user.

2. The method according to claim 1, wherein the step of iterating over the data tuples further comprises ascertaining a rank of each subject tuple, and wherein the step of presenting contents of the query result data structure to a user comprises presenting contents of the query result data structure to the user based on the rank.

3. The method according to claim 2, wherein the rank is based on an ascending order scheme.

4. The method according to claim 2, wherein the rank is based on a descending order scheme.

5. The method according to claim 1, wherein the step of presenting comprises presenting contents of the query result data structure in a graphical format.

6. The method according to claim 5, wherein the graphical format comprises a multi-dimensional format.

7. The method according to claim 1, wherein the step of iterating is performed each time a data tuple is produced by execution of the calculation execution plan.

8. The method according to claim 1, wherein the step of iterating is performed when a predetermined number of data tuples have been produced by execution of the calculation execution plan.

9. The method according to claim 1, wherein the data stream comprises a symbol stream.

10. The method according to claim 1, wherein the query result space comprises an online analytical processing ("OLAP") data cube.

11. The method according to claim 1, wherein the expression includes boolean operators or mathematical operators, and wherein the expression includes multiple operands of different types.

12. The method according to claim 1, wherein the data references comprise attributes.

13. The method according to claim 12, wherein the attributes comprise references to storage locations, the references to storage locations selected from the group comprising: pointers; uniform resource locators; and vectors.

14. The method according to claim 1, wherein the data space comprises a relational database.

15. The method according to claim 1, wherein the query comprises a multidimensional expressions ("MDX") language query.

16. A computer-readable storage medium, not comprising propagated data signal, encoded with computer-executable instructions which, when executed by a processor, perform a method of executing a query of a data space having a number of dimensions, a particular dimension associated with a set of data references, a particular data reference defined to reference one or more stored data items located in one or more computer-readable storage media, the method comprising:
receiving a query of the data space, the query having an expression with an operand comprising a particular dimension or a particular data reference or both, evaluation of the expression producing one or more calculated data items; based on the data space and the query, identifying a query result space, the query result space having one or more result dimensions;
generating a calculation execution plan for each of one or more subcubes covering the query result space and for retrieving, from the one or more computer-readable storage media, stored data items referenced by the sets of data references associated with the result dimensions, and for evaluating the expression based on the retrieved stored data items to produce calculated data items, the calculation execution plan including a subcube to which the calculation execution plan applies and a calculation to be applied to the subcube;
executing the calculation execution plan to produce a stream of data tuples, a particular data tuple having a set of data components storing the retrieved stored data items or storing the produced calculated data items, a particular data component of a particular data tuple being either empty or having a data value;
iterating over each data tuple in the stream, the iterating not including symbolic analysis of calculation expressions within data in the stream, the step of iterating comprising determining whether each data component of the data tuple is empty at an intersection of the data tuple and each result dimension,
when each data component of the data tuple is empty at an intersection of the data tuple and each result dimension, do not include the data tuple in a query result set, and
when any data component of the data tuple has a data value at an intersection of the data tuple and any result dimension, do include the data tuple in the query result set.

17. The computer-readable storage medium according to claim 16, wherein the processor is located within a device selected from the group comprising: a client-side device and a network-side device.

18. A data management system, comprising:
a processor;
a user interface for receiving a query of a data space having a number of dimensions, a particular dimension associated with a set of data references, a particular data reference defined to reference one or more stored data items located in one or more computer-readable storage media, the query having an expression with an operand comprising a particular dimension or a particular data reference or both, evaluation of the expression producing one or more calculated data items;
one or more computer-readable storage media for storing a first data structure and a second data structure; and
an analysis engine comprising a set of computer-executable instructions which, when loaded into the processor and executed, are responsive to
apply the query to the data set to generate a calculation execution plan for each of one or more subcubes covering the query result space and for retrieving, from the one or more computer-readable storage media, stored data items referenced by the sets of data references associated with the result dimensions, and for evaluating the expression based on the retrieved stored data items to produce calculated data items, the calculation execution plan including a subcube to which the calculation execution plan applies and a calculation to be applied to the subcube,
execute the calculation execution plan to produce a stream of data tuples that are populated into the first data structure, a particular data tuple having a set of data components storing the retrieved stored data items or storing the produced calculated data items, a particular data component of a particular data tuple being either empty or having a data value,
iterate over the data tuples in the first data structure to populate a second data structure, the iteration not including symbolic analysis of calculation expressions within data in the stream, the iteration comprising
identifying a subject data tuple populating the first data structure,
determining whether each data component of the subject data tuple is empty at an intersection of the subject data tuple and each result dimension,
when each data component of the subject data tuple is empty at an intersection of the subject data tuple and each result dimension, do not populate a query result set stored in the second data structure with the subject data tuple, and
when any data component of the subject data tuple has a data value at an intersection of the subject data tuple and any result dimension, do populate the second data structure with the subject data tuple, and
after iterating, present contents of the second data structure to a user via the user interface.

19. The system according to claim 18, wherein the analysis engine comprises an online analytical processing ("OLAP") component.

20. The system according to claim 18, wherein the first data structure comprises a stream of records from an analysis engine.

* * * * *